United States Patent Office 3,636,184
Patented Jan. 18, 1972

3,636,184
PROCESS FOR PRODUCTION OF 1,3-DIMETHYL-5-ISOPROPYLBENZENE
Gunter Strehlke, Moers, and Gundolf Fuchs, Steinbeck-Meilsen, Germany, assignors to Deutsche Texaco Aktiengesellschaft
No Drawing. Filed Dec. 1, 1969, Ser. No. 881,269
Claims priority, application Germany, Dec. 5, 1968, P 18 12 781.6
Int. Cl. C07c 3/50, 3/58
U.S. Cl. 260—672 T               7 Claims

ABSTRACT OF THE DISCLOSURE

A multiple step reaction process produces a product composed primarily of high purity 1,3-dimethyl-5-isopropylbenzene with lower concentrations of dimethyldiisopropylbenzenes than obtained heretofore. In the process, a mixture of xylenes is combined with dimethyldiisopropylbenzene in the presence of aluminum chloride for over seven hours, then propylene is added to complete the reaction.

BACKGROUND OF THE INVENTION

The invention relates to a process for the production of 1,3-dimethyl-5-isopropylbenzene by reacting a technical grade of xylene with propylene in the presence of aluminum chloride. The technical grade of xylene used in this process is a mixture primarily of meta and para xylenes and contains only 0–2 wt. percent ortho-xylene.

It is known that by reacting technical grade xylene with propylene and separation of the products by distillation, a mixture of isomeric dimethylisopropylbenzenes containing about 90 percent of 1,3-dimethyl-5-isopropylbenzene can be obtained. It is practically impossible, however, to recover a higher-purity 1,3-dimethyl-5-isopropylbenzene from this mixture, as the boiling points of its isomeric components are extremely close together. It is also known that by reacting pure m-xylene with propylene, a mixture of alkylbenzenes containing about 95 percent 1,3-dimethyl-5-isopropylbenzene can be produced. While this is the highest degree of purity known to be attainable, the process is uneconomical owing to the high price of pure m-xylene.

By the process of a copending patent application of ours, Ser. No. 881,270 filed contemporaneously herewith on Dec. 1, 1969, it is possible to react a mixture of xylenes with propylene in the presence of aluminum chloride to form simultaneously a mixture of isomeric dimethylisopropylbenzenes containing at least 97 percent of 1,3-dimethyl-5-isopropylbenzene, and a mixture of isomeric dimethyldiisopropylbenzenes. In this process, the molar ratio of the dimethylisopropylbenzene cut to the dimethyldiisopropylbenzene cut can be varied between 1:4 and 1:1.5. It would be desirable to increase this ratio above 1:1.5 while maintaining the 1,3-dimethyl-5-isopropylbenzene at a high purity level.

SUMMARY

The present invention permits the production of a mixture of isomeric dimethylisopropylbenzenes and isomeric dimethyldiisopropylbenzenes at mole ratios of the former to the latter above 1:1.5 and up to 1:0.4 while maintaining the concentration of 1,3-dimethyl-5-isopropylbenzene in the dimethylisopropylbenzene cut at a minimum of 97 wt. percent. This result is achieved by maintaining dimethyldiisopropylbenzene and a mixture of xylenes in contact with aluminum chloride for at least seven hours before adding propylene to complete the reaction.

The principal products obtained from this process are useful as intermediates in the production of polyimide and polyester resins.

DESCRIPTION OF THE PREFERRED EMBODIMENTS

The process of this invention comprises several steps:

(a) First, a mixture of xylenes is combined with dimethyldiisopropylbenzene in a mole ratio of xylene to dimethyldiisopropylbenzene between about 65:35 and 75:25, preferably about 70:30, in the presence of aluminum chloride for 7 to 12 hours, preferably 8 hours, at 45 to 55° C., preferably about 50° C.;

(b) Next, propylene is added to this mixture in a mole ratio of propylene to xylene and dimethyldiisopropylbenzene initially added of between 0.85:1.0 and 1.05:1.0, preferably about 0.9:1.0, while the entire mixture is maintained at 45 to 55° C., preferably about 50° C. for a period from about 50 to 80 minutes, preferably about 70 minutes, and (c) Finally, dimethylisopropylbenzene and dimethyldiisopropylbenzene are recovered from the reaction mixture.

In an optional embodiment, the dimethyldiisopropylbenzene added in step (a) of the process is obtained by recycling the required amount from the dimethyldiisopropylbenzene recovered from the reaction mixture in the final step.

The mixture of xylenes employed is a technical grade of xylene having a composition of at least 60 wt. percent meta-xylene, 0–2 wt. percent ortho-xylene and the balance para-xylene. A mixture of only meta and para isomers is preferred containing at least 68 wt. percent meta xylene. The dimethyldiisopropylbenzene employed in the initial step preferably contains at least 80 wt. percent 1,2,4,5-tetraalkylbenzene. A catalyst addition of about 1 wt. percent based on xylene is satisfactory.

The following illustrates the process of the invention.

Seven moles of a technical grade of xylene (68 wt. percent of m-xylene and 32 wt. percent of p-xylene) are stirred for 8 hours at 50° C. with 3 moles of dimethyldiisopropylbenzene containing about 85 wt. percent of 1,2,4,5-tetraalkylbenzenes, and 1 wt. percent (based on the xylene) of aluminum chloride. Subsequently, while maintaining the temperature at 50° C., 9 moles of propylene are introduced at a constant rate within 70 minutes. About 5 moles of a dimethylisopropyl cut and about 5 moles of a dimethyldiisopropyl cut are obtained. The former cut contains at least 97 wt. percent of 1,3-dimethyl-5-isopropylbenzene. The latter cut contains at least 84.5 wt. percent of 1,2,4,5-tetraalkylbenzene. The procedure of the example is then repeated, using 3 moles of the latter cut instead of the 3 moles of dimethyldiisopropylbenzene mentioned above.

As shown by this example, when a portion of the dimethyldiisopropylbenzene product is used as the feed to the process the mole ratio of dimethylisopropylbenzene to dimethyldiisopropylbenzene can be increased to 1:0.4.

We claim:

1. A process for the production of 1,3-dimethyl-5-isopropylbenzene which comprises:

(a) contacting a mixture of xylenes and dimethyldiisopropylbenzene in the presence of aluminum chloride for a period of 7 to 12 hours at a temperature of 45 to 55° C., the mole ratio of xylene to dimethyldiisopropylbenzene being between about 65:35 and 75:25 and the mixture of xylenes consisting essentially of at least 60 wt. percent meta-xylene, 0–2 wt. percent ortho-xylene and the balance para-xylene, (b) adding propylene to the mixture of step (a) in a mole ratio of propylene to xylene and dimethyldiisopropylbenzene initially added in step (a) of between 0.85:1.0 and 1.05:1.0 while maintaining the temperature at 45 to 55° C. for 50 to 80 minutes, and
(c) recovering dimethylisopropylbenzene and dimethyldiisopropylbenzene from the reaction mixture.

2. A process according to claim 1 wherein step (c) the dimethylisopropylbenzene comprises at least 97 wt. percent 1,3-dimethyl-5-isopropylbenzene.

3. A process according to claim 1 wherein step (a) the period is 8 hours, the temperature is about 50° C. and the mole ratio is about 70:30 and in step (b) the mole ratio is about 0.9:1.0, the period is about 70 minutes and the temperature is about 50° C.

4. A process according to claim 3 wherein the mixture of xylenes consists essentially of 68 wt. percent meta-xylene and 32 wt. percent para-xylene.

5. A process according to claim 1 wherein a portion of the dimethyldiisopropylbenzene recovered in step (c) is employed as the dimethyldiisopropylbenzene reactant of step (a).

6. A process according to claim 5 where in step (c) the dimethyldiisopropylbenzene comprises at least 80 wt. percent 1,2,4,5-tetraalkylbenzene.

7. A process according to claim 6 wherein the final reaction products comprise from 1.5 to 0.4 moles of dimethyldiisopropylbenzene per mole of dimethylisopropylbenzene.

References Cited

UNITED STATES PATENTS

| | | | |
|---|---|---|---|
| 2,803,683 | 8/1957 | McCaulay et al. | 260—671 |
| 3,284,523 | 11/1966 | Beck et al. | 260—668 |
| 3,345,426 | 10/1967 | Langer | 260—671 |
| 3,488,741 | 1/1970 | Muller | 260—671 |

DELBERT E. GANTZ, Primary Examiner

G. E. SCHMITKONS, Assistant Examiner

U.S. Cl. X.R.

260—671 P